(12) United States Patent
Franz et al.

(10) Patent No.: US 7,395,205 B2
(45) Date of Patent: Jul. 1, 2008

(54) DYNAMIC LANGUAGE MODEL MIXTURES WITH HISTORY-BASED BUCKETS

(75) Inventors: Martin Franz, Yortkown Heights, NY (US); Peder Andreas Olsen, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1807 days.

(21) Appl. No.: 09/782,434

(22) Filed: Feb. 13, 2001

(65) Prior Publication Data

US 2002/0111806 A1    Aug. 15, 2002

(51) Int. Cl.
    G10L 15/14    (2006.01)
(52) U.S. Cl. ............................................. 704/256.3
(58) Field of Classification Search .............. 704/256.3
    See application file for complete search history.

(56) References Cited

U.S. PATENT DOCUMENTS 5,621,809 A * 4/1997 Bellegarda et al. .......... 382/116
5,625,749 A * 4/1997 Goldenthal et al. ......... 704/254
5,950,158 A * 9/1999 Wang ......................... 704/244
6,167,377 A * 12/2000 Gillick et al. ............... 704/240
2003/0093272 A1 * 5/2003 Soufflet et al. .............. 704/231

* cited by examiner

*Primary Examiner*—David R. Hudspeth
*Assistant Examiner*—Jakieda R Jackson
(74) *Attorney, Agent, or Firm*—F. Chau & Associates, LLC (57) ABSTRACT

In an Automatic Speech Recognition (ASR) system having at least two language models, a method is provided for combining language model scores generated by at least two language models. A list of most likely words is generated for a current word in a word sequence uttered by a speaker, and acoustic scores corresponding to the most likely words are also generated. Language model scores are computed for each of the most likely words in the list, for each of the at least two language models. A set of coefficients to be used to combine the language model scores of each of the most likely words in the list is respectively and dynamically determined, based on a context of the current word. The language model scores of each of the most likely words in the list are respectively combined to obtain a composite score for each of the most likely words in the list, using the set of coefficients determined therefor.

23 Claims, 4 Drawing Sheets

DYNAMIC LANGUAGE MODEL MIXTURES WITH HISTORY-BASED BUCKETS

BACKGROUND OF THE INVENTION

1. Technical Field

The present invention relates generally to speech recognition and, in particular, to a method and system for combining language model scores generated by a language model mixture in an Automatic Speech Recognition system.

2. Description of Related Art

In general, an Automatic Speech Recognition (ASR) system includes a vocabulary, an acoustic model, and a language model (LM). The vocabulary is a table of words, with each word represented as a sequence of phones which are combined to form the pronunciation of the word. The acoustic model constructs a list of candidate words given the acoustic data. The language model predicts the current word using its word context.

The language model generally includes a collection of conditional probabilities corresponding to the combining of words in the vocabulary. The task of the language model is to express the restrictions imposed on the way in which words can be combined to form sentences. Some of the most popular language models are n-gram models which make the assumption that the a priori probability of a word sequence can be decomposed into conditional probabilities of each word given the n words preceding it. In the context of n-gram language models, a trigram is a string of three consecutive words (denoted by $w_1 w_2 w_3$). Similarly, a bigram is a string of two consecutive words, and a unigram is a single word. The conditional probability of the trigram model may be expressed as follows: $\text{Prob}(w_3 | w_2 w_1)$.

Generally, a trigram language model is trained using a transcription consisting of a large text corpus. The corpus consists of sentences, which nominally correspond to individual utterances that a speaker might produce in the context of a particular task. The training involves inputting the sentences and determining statistics for each word model in a manner which enhances the probability of the correct word relative to the probabilities associated with other words. As is known, such training provides counts for all trigrams, bigrams and unigrams identified in the corpus. The count of a given n-gram is the number of occurrences of the given n-gram in the corpus (word frequency).

The training of the language model results in determining the likelihood of each ordered triplet of words, ordered pair of words, or single words in the vocabulary. From these likelihoods, a list of the most likely triplets of words and a list of the most likely pairs of words are formed. Additionally, the likelihood of a triplet not being in the triplet list and the likelihood of a pair not being in the pair list are determined.

The probability assigned by the language model to a subject word will now be described. When a subject word follows two words, a determination is made as to whether the subject word and the two preceding words are on the most likely triplet list described above with reference to the training of the language model. If so, the stored probability assigned to the triplet is indicated. If the subject word and its two predecessors are not on the triplet list, a determination is made as to whether the subject word and its adjacent predecessor are on the most likely pairs of words list described above. If so, the probability of the pair is multiplied by the probability of a triplet not being the triplet list, and the product is assigned to the subject word. If the subject word and its predecessor(s) are not on the triplet list or pair list, the probability of the subject word alone is multiplied by the likelihood of a triplet not being on the most likely triplet list and by the probability of a pair not being on the most likely pair list. The product is assigned to the subject word.

Thus, the language model is used to enhance the probability of a correct word selection during the decoding process. This is because while most of the candidate words selected by the fast match module (described below) will be acoustically similar to the correct word, some of the candidate words may be removed from further consideration based on linguistics. For example, in the context of the following two words by the ($w_1 w_2$), the acoustic fast match list for the correct word way ($w_3$) might include linguistically unlikely words such as say, ray, and may.

Figure 1:
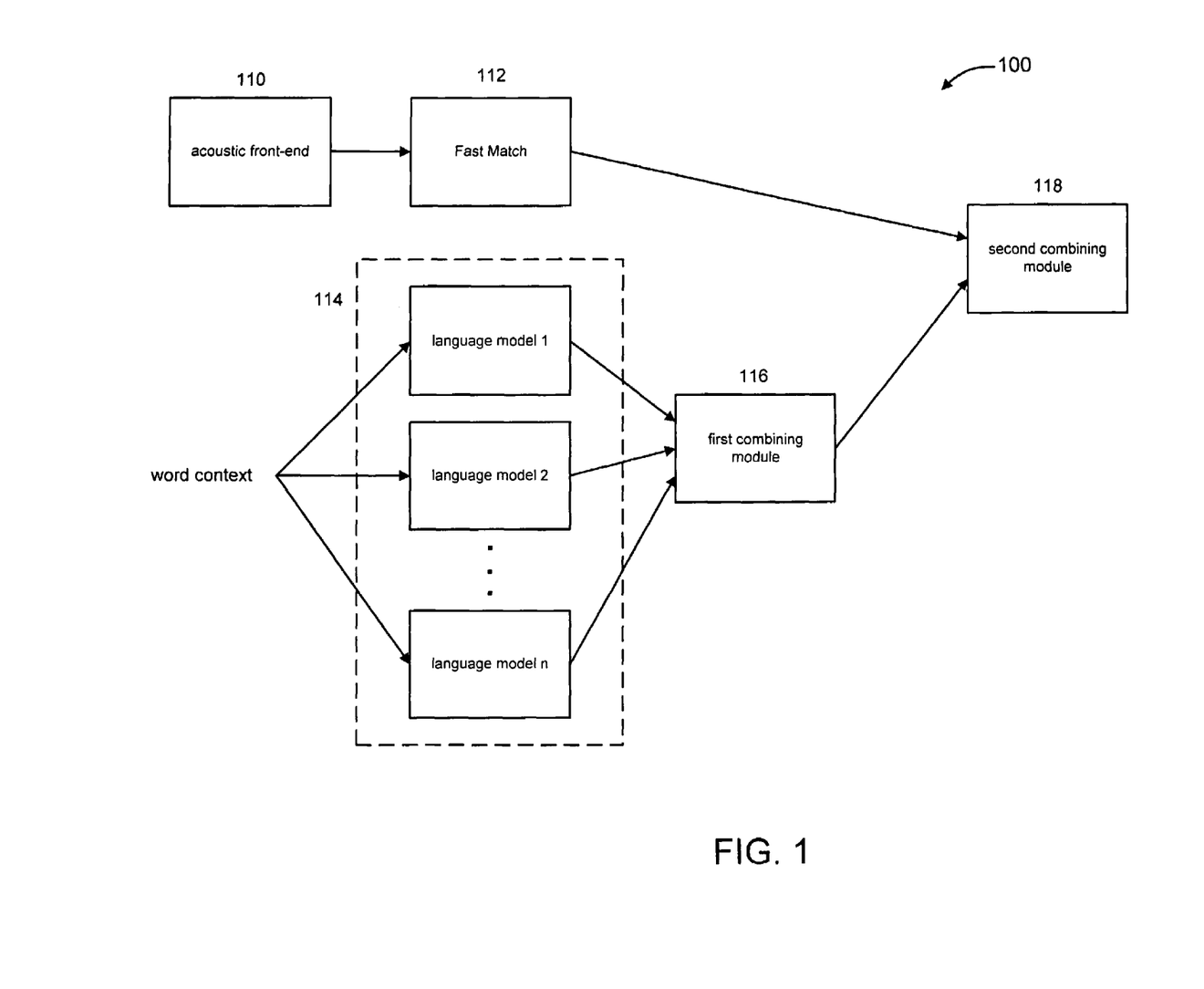
FIG. 1 is a block diagram illustrating an Automatic Speech Recognition (ASR) system 100 having a language model mixture according to the prior art.

FIG. 1 is a block diagram illustrating an Automatic Speech Recognition (ASR) system 100 having a language model mixture according to the prior art. The ASR system 100 includes: an acoustic front-end 110; a Fast Match (FM) 112; a set of language models 114; a first combining module 116; and a second combining module 118.

Acoustic data, produced by the acoustic front-end 110, is processed by the Fast Match module 112 to construct a list of probable words for the current position in a word sequence. Previously recognized words are used by the set of language models 114 to predict the current word. Each of the language models assigns a score to each of the words predicted by the Fast Match Module 112. The scores produced by the individual language models are combined by the first combining module 116 to produce a single language model score for each word predicted by the Fast Match Module 112. The language model score and fast match score for each word are then combined by the second combining module 118.

The interpolated trigram models used in IBM's VIA VOICE language models are a weighted mixture of a raw trigram, bigram, unigram and uniform probability model. The weights are dependent on "buckets" that depend on the immediate history $w_1 w_2$ of a word $w_3$ in a word triplet $w_1 w_2 w_3$. The weights are expected to change for the different "buckets" so as to make the trigram model more important for word pairs $w_1 w_2$ that were frequently seen and less important when $w_1 w_2$ were less frequently seen in the training corpus. Similarly, it is known that weighted mixtures of language models can be formed and the weights estimated by the Baum Welch algorithm. However, to the extent that language model mixtures have been used in the prior art, such use has been limited to dynamically mixing the layers (e.g., trigram, bigram, unigram layers) of a single language model and then combining the scores.

Although ASR systems with language models mixtures generally have a lower word error rate (WER) than ASR systems with a single language model, it is nonetheless desirable that the WER of the former systems be even lower. Accordingly, there is a need for a method and/or system for decoding a speech utterance by an ASR system with a language model mixture that has a reduced WER with respect to the prior art.

SUMMARY OF THE INVENTION

The problems stated above, as well as other related problems of the prior art, are solved by the present invention, a method and system for combining language model scores generated by a language model mixture in an Automatic Speech Recognition system.

According to a first aspect of the invention, in an Automatic Speech Recognition (ASR) system having at least two language models, a method is provided for combining language model scores generated by at least two language models. The method includes the step of generating a list of most likely words for a current word in a word sequence uttered by a speaker, and acoustic scores corresponding to the most likely words. Language model scores are computed for each of the most likely words in the list, for each of the at least two language models. A set of coefficients to be used to combine the language model scores of each of the most likely words in the list is respectively and dynamically determined, based on a context of the current word. The language model scores of each of the most likely words in the list are respectively combined to obtain a composite score for each of the most likely words in the list, using the set of coefficients determined therefor.

According to a second aspect of the invention, the determining step includes the step of dividing text data for training a plurality of sets of coefficients into partitions, depending on words counts corresponding to each of the at least two language models. Further, for each of the most likely words in the list, the set of coefficients is dynamically selected from among the plurality of sets of coefficients so as to maximize the likelihood of the text data with respect to the at least two language models.

According to a third aspect of the invention, the at least two language models include a first and a second language model, and the dividing step includes the step of grouping, in a same partition, word triplets $w_1 w_2 w_3$ which have a count for the word pair $w_1 w_2$ in the first language model greater than the count of the word pair $w_1 w_2$ in the second language model.

According to a fourth aspect of the invention, the selecting step includes the step of applying the Baum Welch iterative algorithm to the plurality of sets of coefficients.

According to a fifth aspect of the invention, the method further includes the step of, for each of the most likely words in the list, combining an acoustic score and the composite score to identify a group of most likely words to be further processed.

According to a sixth aspect of the invention, the group of most likely words contains less words than the list of most likely words.

According to a seventh aspect of the invention, the partitions are independent from the at least two language models.

According to an eighth aspect of the invention, the method further includes the step of representing the set of coefficients by a weight vector comprising n-weights, where n equals a number of language models in the system.

According to a ninth aspect of the invention, the combining step includes the steps of, for each of the most likely words in the list: multiplying a coefficient corresponding to a language model by a language model score corresponding to the language model to obtain a product for each of the at least two language models; and summing the product for each of the at least two language models.

According to a tenth aspect of the invention, the text data for training the plurality of sets of coefficients is different than language model text data used to train the at least two language models.

According to an eleventh aspect of the invention, there is provided a method for combining language model scores generated by at least two language models included in an Automatic Speech Recognition (ASR) system. The method includes the step of generating a list of most likely words for a current word in a word sequence uttered by a speaker, and acoustic scores corresponding to the most likely words. Language model scores are computed for each of the most likely words in the list, for each of the at least two language models. A weight vector to be used to combine the language model scores of each of the most likely words in the list is respectively and dynamically determined based on a context of the current word. The weight vector includes n-weights, wherein n equals a number of language models in the system, and each of the n-weights depends upon history n-gram counts. The language model scores of each of the most likely words in the list are respectively combined to obtain a composite score for each of the most likely words in the list, using the weight vector determined therefor.

According to a twelfth aspect of the invention, the determining step includes the step of dividing text data for training a plurality of weight vectors into partitions, depending on words counts corresponding to each of the at least two language models. For each of the most likely words in the list, the weight vector is dynamically selected from among the plurality of weight vectors so as to maximize the likelihood of the text data with respect to the at least two language models.

According to a thirteenth aspect of the invention, the selecting step includes the step of applying the Baum Welch iterative algorithm to the plurality of weight vectors.

According to a fourteenth aspect of the invention, the method further includes the step of, for each of the most likely words in the list, combining an acoustic score and the composite score to identify a group of most likely words to be further processed.

According to a fifteenth aspect of the invention, the partitions are independent from the at least two language models.

According to a sixteenth aspect of the invention, each of the plurality of weight vectors include a set of coefficients, and the combining step includes the steps of, for each of the most likely words in the list: multiplying a coefficient corresponding to a language model by a language model score corresponding to the language model to obtain a product for each of the at least two language models; and summing the product for each of the at least two language models.

According to a seventeenth aspect of the invention, there is provided a combining system for combining language model scores generated by at least two language models included in an Automatic Speech Recognition (ASR) system. The ASR system has a fast match for generating a list of most likely words for a current word in a word sequence uttered by a speaker and acoustic scores corresponding to the most likely words. The combining system includes a language model score computation device adapted to compute language model scores for each of the most likely words in the list, for each of the at least two language models. A selection device is adapted to respectively and dynamically select a weight vector to be used to combine the language model scores of each of the most likely words in the list based on a context of the current word. The weight vector includes n-weights, wherein n equals a number of language models in the system, and each of the n-weights depends upon history n-gram counts. A combination device is adapted to respectively combine the language model scores of each of the most likely words in the list to obtain a composite score for each of the most likely words in the list, using the weight vector selected therefor.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

The present invention is directed to a method and system for combining language model scores generated by a language model mixture in an Automatic Speech Recognition system. It is to be understood that the present invention may be implemented in various forms of hardware, software, firmware, special purpose processors, or a combination thereof. Preferably, the present invention is implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device.

It is to be further understood that, because some of the constituent system components depicted in the accompanying Figures may be implemented in software, the actual connections between the system components may differ depending upon the manner in which the present invention is programmed. Given the teachings herein, one of ordinary skill in the related art will be able to contemplate these and similar implementations or configurations of the present invention.

A general description of the present invention will now be provided to introduce the reader to the concepts of the invention. Subsequently, more detailed descriptions of various aspects of the invention will be provided with respect to FIGS. 2 through 5.

The invention is directed to combining the evidence produced by multiple language models used simultaneously in an Automatic Speech Recognition (ASR) system. The basic idea is to combine the scores of the language models dynamically, based on the word history of the current word. More specifically, for a given word history, a vector of language model weights is used which depends on the history n-gram counts. Coefficient vectors for various combinations of history counts are trained on held out data using, for example, the well-known Baum Welch iterative algorithm. It is to be appreciated that while the training of the coefficient vectors is described using the Baum Welch algorithm, other methodologies may be used to accomplish the same while maintaining the spirit and scope of the present invention.

The held out data is a specially dedicated set of data used to train the mixture weights. In particular, this data should exclude the data used to train the individual language models. Preferably, the data should resemble data for which the system will be applied. In terms of format, the data is simply text (sequence of words).

Figure 2:
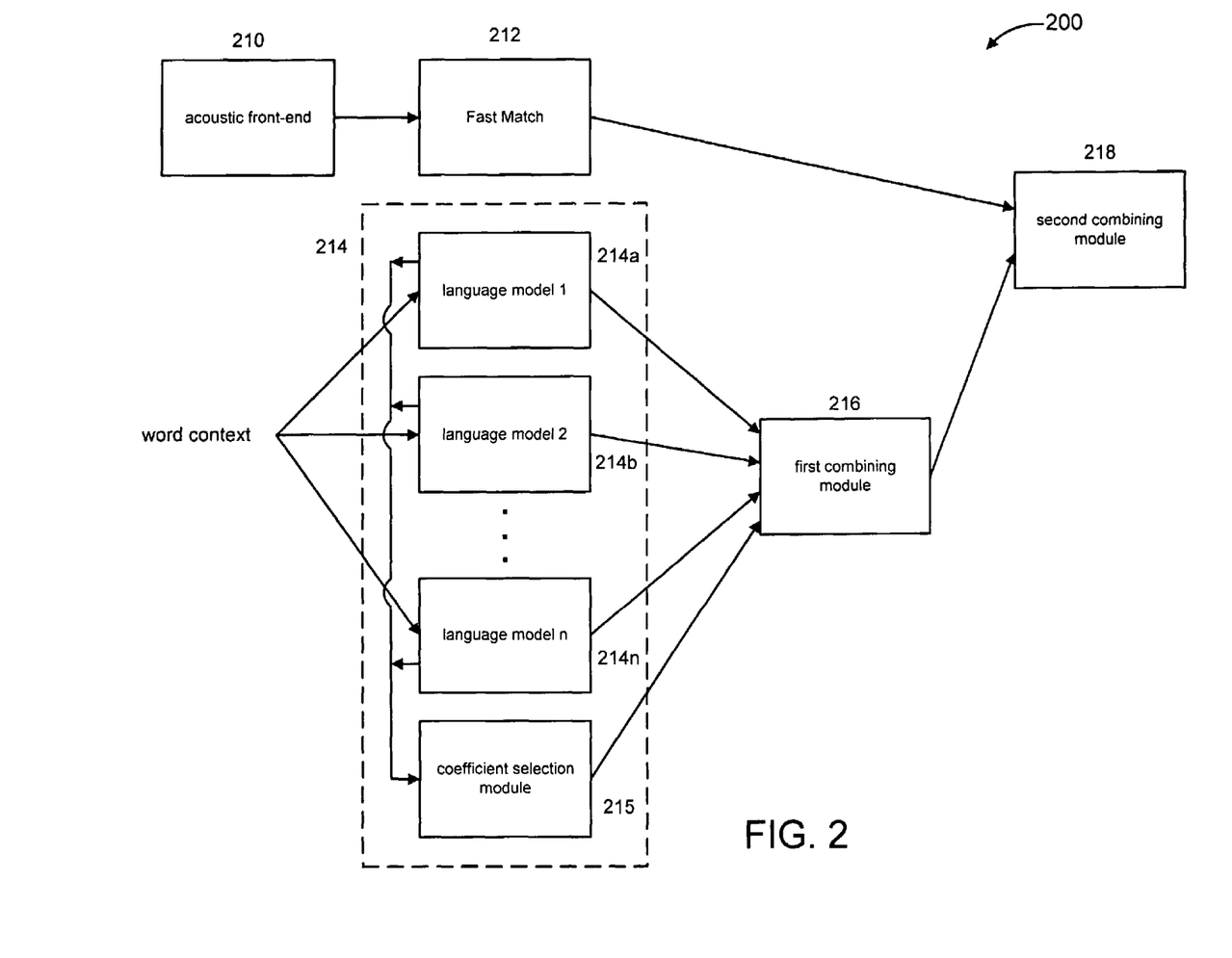
FIG. 2 is a block diagram illustrating an Automatic Speech Recognition (ASR) system 200 having a dynamic language model mixture according to an illustrative embodiment of the present invention.

FIG. 2 is a block diagram illustrating an Automatic Speech Recognition (ASR) system 200 having a dynamic language model mixture according to an illustrative embodiment of the present invention. The ASR system 200 includes: an acoustic front-end 210; a Fast Match (FM) module 212; a set of language models 214; a coefficient selection module 215; a first combining module 216; and a second combining module 218. The set of language models include a first language model 214a, a second language model 214b, and an nth language model 214n. It is to be appreciated that the Fast Match Module 212 and the set of language models 214 operate in the same manner as described above with respect to the Fast Match Module 112 and the set of language models 114 of FIG. 1.

After the individual LM scores are computed, the ASR system 200 uses the current word history (i.e., the last few words) to determine how to combine the individual LM scores. The overall LM score is computed as:

$$\text{score}_{total} = \lambda_1 * \text{score}_{lm1} + \lambda_2 * \text{score}_{lm2} + \ldots + \lambda_n * \text{score}_{lmn} \quad (1)$$

where $\text{score}_{lm1}$ is the likelihood score assigned to the word by the first language model 214a, $\text{score}_{lm2}$ is the score produced by the second language model 214b, and so forth, and $\lambda_1$ is the relative weight of the first language model 214a, $\lambda_2$ is the relative weight of the second language model 214b, and so forth. The set of $\lambda$ coefficients to be used is selected by the coefficient selection module 215 based on the current word history. The method to construct the $\lambda$ sets is described further below.

Figure 3:
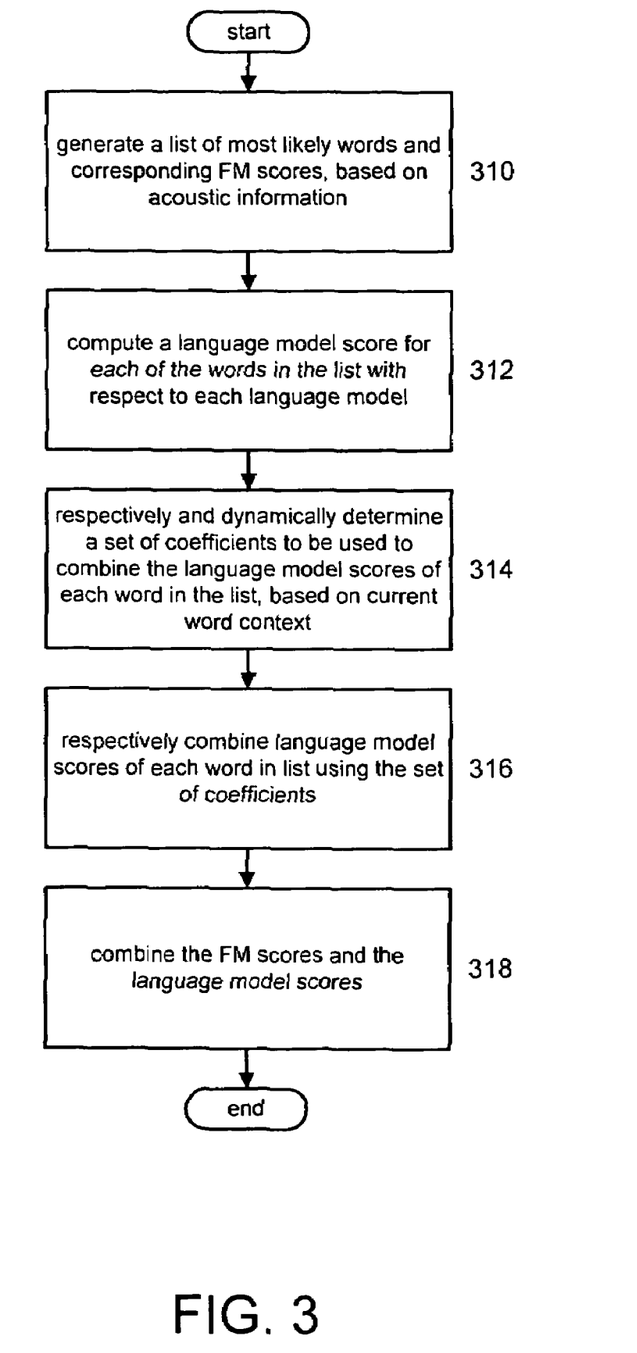
FIG. 3 is a flow diagram illustrating to a method for combining language model scores generated by a language model mixture in an Automatic Speech Recognition (ASR) system, according to an illustrative embodiment of the present invention.

FIG. 3 is a flow diagram illustrating to a method for combining language model scores generated by a language model mixture in an Automatic Speech Recognition (ASR) system, according to an illustrative embodiment of the present invention.

A list of most likely words (Fast Match list) for a current word in the word sequence, and acoustic scores (FM scores) corresponding to the most likely words, are generated (step 310). The list and acoustic scores are generated based upon the acoustic information corresponding to the speech utterance. For each of the words in the Fast Match list, a language model score for each of the language models is computed (step 312).

A set of $\lambda$ coefficients to be used to combine the language models scores of each of the most likely words in the list is respectively determined using the context (history) of the current word (step 314). The language model scores of each of the most likely words in the list are respectively combined using the set of $\lambda$ coefficients (step 316). The Fast Match and the language model scores are then combined (step 318).

A more detailed description of step 314 of FIG. 3 will now be given, accordance to an illustrative embodiment of the invention. Moreover, the description of step 314 is followed by a description of buckets and their use in accordance with the present invention, according to an illustrative embodiment thereof.

We first elaborate on how a traditional n-gram model is constructed. In particular, we will address the case of trigrams. A general trigram is an interpolation of raw trigram, bigram, unigram and uniform frequencies. That is we write $$P(w\_3 | w\_1 w\_2) = lambda\_3\ C(w\_1\ W\_2\ W\_3)/C(W\_1\ W\_2) + lambda\_2\ C(w\_2\ W\_3)/C(w\_2) + lambda\_1\ c(w\_3)/N + lambda\_0/V$$

where c( . . . ) is the corresponding frequency count in the training data, N is the number of words occurring in the training data, V is the size of the vocabulary and P( . . . ) is the desired likelihood score from the trigram model.

In the formula for the trigram model one might expect that if a bigram history w_1 w_2 is seen infrequently that the first term c(w_1 w_2 w_3)/c(w_1 w_2) may provide an unreliable likelihood value. Thus, we may wish to trust the next term c(w_2 w_3)/c(w_2) more unless w_2 occurs infrequently in the training data in which case we may want to shift our mixture weights more towards the 3rd and 4th term. This line of thought argues that the mixture weights should depend on the history w_1 w_2. However, instead of determining the individual weights (lambda_3 . . . lambda_0) for each history w_1 w_2, we divide the data into buckets and use the held-out data to estimate the optimal weight values for each bucket.

A bucket is a collection of the history-part of n-grams. In particular, all buckets are disjoint and the union of all buckets will cover all possible histories. For example, for trigrams w_1 w_2 w_3 a bucket will contain various values of the history w_1 w_2 that are considered to "behave" similarly. As an example, we might put the n-grams with the count of w_1 w_2 smaller than some value t1 into bucket b_1, the n-grams with the w_1 w_2 count greater than t1 but smaller than t2 into bucket b_2 and so on. Note that in this case we only used one history-based value (count of w_1 w_2) to determine the bucket the n-gram is assigned to. However, it is possible to use other values such as, for example, the count of w_1 or, in the case of bucketing based on multiple language models, we use history based values with respect to various language models (e.g., the count of w_1 w_2 in model 1, the count of w_1 w_2 in model 2, the count of w_1 in model 3, and so on). The actual threshold values are determined so that there is a large enough number (preferably hundreds) of events (n-gram occurrences) for each bucket in the held-out data.

It is to be appreciated that dynamic mixing according to the invention may be done with or without bucketing. For example, in the latter case, any mechanism may be employed that sets the weights assigned to the individual language models dynamically (on a word-by-word basis) using the information (e.g., history count from the individual language models). It is to be further appreciated that in the former case, the buckets can be made independent of (or dependent upon) the buckets that are internal to the individual language models. Given the teachings of the present invention provided herein, one of ordinary skill in the related art will contemplate these and various other configurations and modification of the present invention, while maintaining the spirit and scope thereof.

Figure 4:
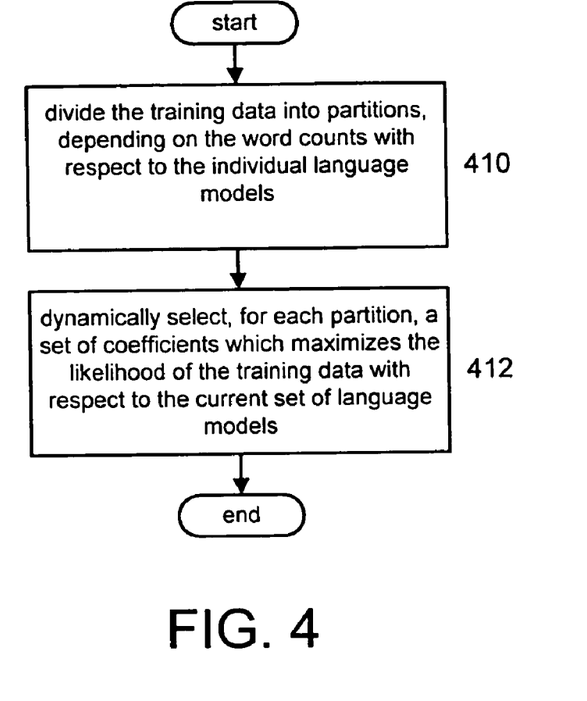
FIG. 4 is a flow diagram illustrating a method for determining the coefficient sets used to dynamically combine multiple language models, according to an illustrative embodiment of the present invention.

FIG. 4 is a flow diagram illustrating a method for determining the coefficient sets used to dynamically combine multiple language models, according to an illustrative embodiment of the present invention. The method of FIG. 4 further illustrates step 314 of FIG. 3. It is to be appreciated that the method of FIG. 4 presumes the existence of a set of language models and additional text data used to train the coefficients.

The text data is divided into partitions, depending on the word counts with respect to the individual language models (step 410). Note that the partitioning depends only on the words on the history positions. Thus, for a trigram model, which uses the last two words $w_1 w_2$ to predict the current word W3, the partitioning depends on $w_1$ and $w_2$.

For each partition, a set of coefficients λ is selected which maximizes the likelihood of the text data with respect to the current set of language models (step 412). For example, in the case when buckets are used, the held-out data is divided into partitions, corresponding to the individual buckets and then, for each of the partitions, a set of weights is found that maximizes the likelihood of a sequence of words n the held-out data for the given set of language models.

Step 412 may be performed using the well known Baum Welch iterative algorithm. The Baum Welch iterative algorithm is described by Bahl et al., in "A Fast Algorithm for Deleted Interpolation", Proceedings Eurospeech, 3, pp. 1209-12, September 1991; and Baum et al., in "An inequality with Applications to Statistical Estimation for Probabilistic Functions of Markov Processes and to a model of Ecology", Bull. Amer. Math. Soc., pp. 360-63, May 19670 It is to be appreciated that while the invention is described with respect to the Baum Welch algorithm, other methodologies may be used to maximize the likelihood of the text data with respect to the current set of language models while maintaining the spirit and scope of the invention.

Figure 5:
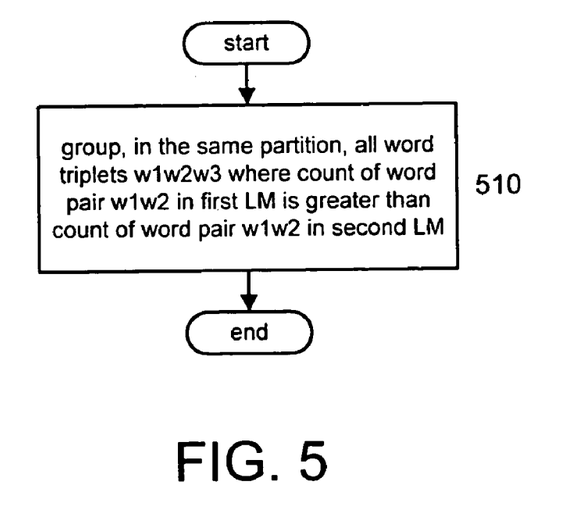
FIG. 5 is a flow diagram illustrating a method for dividing the text data used for training the language models into partitions, according to an illustrative embodiment of the present invention.

FIG. 5 is a flow diagram illustrating a method for dividing the text data used for training the language models into partitions, according to an illustrative embodiment of the present invention. The method of FIG. 5 further illustrates step 410 of FIG. 4.

All the word triplets $w_1 w_2 w_3$ where the count (frequency) of the word pair $w_1 w_2$ in the first language model is greater than the count (frequency) of the word pair $w/w_2$ in the second language model are grouped in the same partition (step 510). It is to be appreciated that step 510 illustrates one of many ways in which the text data may be divided into partitions. Other methodologies may be used for accomplishing the same, while maintaining the spirit and scope of the present invention.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. In an Automatic Speech Recognition (ASR) system having at least two language models, a method for combining language model scores generated by at least two language models, said method comprising the steps of:

generating a list of most likely words for a current word in a word sequence uttered by a speaker, and acoustic scores corresponding to the most likely words;

computing language model scores for each of the most likely words in the list, for each of the at least two language models;

respectively and dynamically determining a set of coefficients to be used to combine the language model scores of each of the most likely words in the list, based on a context of the current word; and respectively combining the language model scores of each of the most likely words in the list to obtain a composite score for each of the most likely words in the list, using the set of coefficients determined therefor;

wherein said determining step comprises the steps of:

dividing text data for training a plurality of sets of coefficients into partitions, depending on word counts corresponding to each of the at least two language models; and for each of the most likely words in the list, dynamically selecting the set of coefficients from among the plurality of sets of coefficients so as to maximize the likelihood of the text data with respect to the at least two language models.

2. The method according to claim 1, wherein the at least two language models comprise a first and a second language model, and said dividing step comprises the step of grouping, in a same partition, word triplets $w_1 w_2 w_3$ which have a count for the word pair $w_1 w_2$ in the first language model greater than the count for the word pair $w_1 w_2$ in the second language model.

3. The method according to claim 1, wherein said selecting step comprises the step of applying the Baum Welch iterative algorithm to the plurality of sets of coefficients.

4. The method according to claim 1, further comprising the step of, for each of the most likely words in the list, combining an acoustic score and the composite score to identify a group of most likely words to be further processed.

5. The method according to claim 1, wherein the group of most likely words contains less words than the list of most likely words.

6. The method according to claim 1, wherein the partitions are independent from the at least two language models.

7. The method according to claim 1, further comprising the step of representing the set of coefficients by a weight vector comprising n-weights, where n equals a number of language models in the system.

8. The method according to claim 1, wherein said combining step comprises the steps of:
for each of the most likely words in the list,
multiplying a coefficient corresponding to a language model by a language model score corresponding to the language model to obtain a product for each of the at least two language models; and
summing the product for each of the at least two language models.

9. The method according to claim 1, wherein the text data for training the plurality of sets of coefficients is different than language model text data used to train the at least two language models.

10. A method for combining language model scores generated by at least two language models comprised in an Automatic Speech Recognition (ASR) system, said method comprising the steps of:
generating a list of most likely words for a current word in a word sequence uttered by a speaker, and acoustic scores corresponding to the most likely words;
computing language model scores for each of the most likely words in the list, for each of the at least two language models;
respectively and dynamically determining a weight vector to be used to combine the language model scores of each of the most likely words in the list based on a context of the current word, the weight vector comprising n-weights, wherein n equals a number of language models in the system, and each of the n-weights depends upon history n-gram counts; and
respectively combining the language model scores of each of the most likely words in the list to obtain a composite score for each of the most likely words in the list, using the weight vector determined therefor.

11. The method according to claim 10, wherein said determining step comprises the steps of:
dividing text data for training a plurality of weight vectors into partitions, depending on words counts corresponding to each of the at least two language models; and
for each of the most likely words in the list, dynamically selecting the weight vector from among the plurality of weight vectors so as to maximize the likelihood of the text data with respect to the at least two language models.

12. The method according to claim 11, wherein said selecting step comprises the step of applying the Baum Welch iterative algorithm to the plurality of weight vectors.

13. The method according to claim 11, wherein the partitions are independent from the at least two language models.

14. The method according to claim 10, wherein the at least two language models comprise a first and a second language model, and said dividing step comprises the step of grouping, in a same partition, word triplets $w_1 w_2 w_3$ which have a count for the word pair $w_1 w_2$ in the first language model greater than the count for the word pair $w_1 w_2$ in the second language model.

15. The method according to claim 10, further comprising the step of, for each of the most likely words in the list, combining an acoustic score and the composite score to identify a group of most likely words to be further processed.

16. The method according to claim 10, wherein each of the plurality of weight vectors comprise a set of coefficients, and said combining step comprises the steps of:
for each of the most likely words in the list,
multiplying a coefficient corresponding to a language model by a language model score corresponding to the language model to obtain a product for each of the at least two language models; and
summing the product for each of the at least two language models.

17. The method according to claim 10, wherein the text data for training the plurality of sets of coefficients is different than language model text data used to train the at least two language models.

18. A combining system for combining language model scores generated by at least two language models comprised in an Automatic Speech Recognition (ASR) system, the ASR system having a fast match for generating a list of most likely words for a current word in a word sequence uttered by a speaker and acoustic scores corresponding to the most likely words, said combining system comprising:
a language model score computation device adapted to compute language model scores for each of the most likely words in the list, for each of the at least two language models;
a selection device adapted to respectively and dynamically select a weight vector to be used to combine the language model scores of each of the most likely words in the list based on a context of the current word, the weight vector comprising n-weights, wherein n equals a number of language models in the system, and each of the n-weights depends upon history n-gram counts; and
a combination device adapted to respectively combine the language model scores of each of the most likely words in the list to obtain a composite score for each of the most likely words in the list, using the weight vector selected therefor.

19. The combining system according to claim 18, further comprising a dividing device adapted to divide text data for training a plurality of weight vectors into partitions, depending on words counts corresponding to each of the at least two language models.

20. The combining system according to claim 19, wherein said selection device is further adapted, for each of the most likely words in the list, to dynamically select the weight vector from among the plurality of weight vectors so as to maximize the likelihood of the text data with respect to the at least two language models.

21. The combining system according to claim 19, wherein the partitions are independent from the at least two language models.

22. The combining system according to claim 18, wherein the at least two language models comprise a first and a second language model, and said dividing device is further adapted to group, in a same partition, word triplets $w_1w_2w_3$ which have a count for the word pair $w_1\ w_2$ in the first language model greater than the count of the word pair $w_1w_2$ in the second language model.

23. The combining system according to claim 18, wherein each of the plurality of weight vectors comprise a set of coefficients, and said combining device is adapted, for each of the most likely words in the list, to multiply a coefficient corresponding to a language model by a language model score corresponding to the language model to obtain a product for each of the at least two language models, and to sum the product for each of the at least two language models.

* * * * *